United States Patent
Joseph et al.

(10) Patent No.: US 7,120,244 B2
(45) Date of Patent: *Oct. 10, 2006

(54) CALL ROUTING FROM MANUAL TO AUTOMATED DIALOG OF INTERACTIVE VOICE RESPONSE SYSTEM

(75) Inventors: Kurt M. Joseph, Austin, TX (US); Aaron W. Bangor, Austin, TX (US); Robert R. Bushey, Cedar Park, TX (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/948,507

(22) Filed: Sep. 23, 2004

(65) Prior Publication Data

US 2005/0041796 A1    Feb. 24, 2005

Related U.S. Application Data

(63) Continuation of application No. 10/190,145, filed on Jul. 5, 2002, now Pat. No. 6,807,274.

(51) Int. Cl.
*H04M 3/523*    (2006.01)
*H04Q 3/64*     (2006.01)

(52) U.S. Cl. .............................. 379/265.01; 379/265.1; 379/265.14; 379/266.06

(58) Field of Classification Search ........... 379/265.01, 379/265.02, 265.1, 266.01, 266.05, 266.06, 379/265.14, 266.03
See application file for complete search history.

(56) References Cited

U.S. PATENT DOCUMENTS

| | | | |
|---|---|---|---|
| 5,511,112 A | 4/1996 | Szlam | 379/88 |
| 5,561,711 A | 10/1996 | Muller | 379/266.08 |
| 5,678,002 A | 10/1997 | Fawcett et al. | 395/183.01 |
| 5,884,032 A | 3/1999 | Bateman et al. | 709/204 |
| 6,141,328 A | 10/2000 | Nabkel et al. | 370/259 |
| 6,157,655 A | 12/2000 | Shtivelman | 370/412 |
| 6,389,028 B1 | 5/2002 | Bondarenko et al. | 370/401 |
| 6,389,400 B1 | 5/2002 | Bushey et al. | 705/7 |
| 6,731,722 B1 | 5/2004 | Coffey | 379/88.01 |
| 6,807,274 B1 * | 10/2004 | Joseph et al. | 379/265.01 |
| 2002/0067823 A1 | 6/2002 | Walker et al. | 379/266.01 |
| 2003/0007628 A1 | 1/2003 | Vortman et al. | 379/266.07 |

* cited by examiner

*Primary Examiner*—Harry S. Hong
(74) *Attorney, Agent, or Firm*—Baker Botts L.L.P.

(57) ABSTRACT

A customer service call system that provides both manual (assisted by a service representative) and automated problem solving dialogs. A routing process determines which dialog is appropriate for incoming calls. The routing process determines a probability that the automated system will resolve the problem and also determines an expected hold time for the customer to reach the manual dialog. The routing process uses this information to determine how the call should be routed.

26 Claims, 2 Drawing Sheets

CALL ROUTING FROM MANUAL TO AUTOMATED DIALOG OF INTERACTIVE VOICE RESPONSE SYSTEM

RELATED APPLICATIONS

This application is a continuation of prior application Ser. No. 10/190,145, entitled "Call Routing from Manual to Automated Dialog of Interactive Voice Response System" filed Jul. 5, 2002, now U.S. Pat. No. 6,807,274.

TECHNICAL FIELD OF THE INVENTION

This invention relates to interactive voice response systems for providing customer service, and more particularly to a method for routing calls from manual to automated dialogs.

BACKGROUND OF THE INVENTION

A business or company that provides services and/or products to clients or customers may provide their customers with customer service in the form of a customer service center that handles customer requests. Customer requests may comprise requesting new products or services, getting support for a product or service, asking questions about a product or service, etc. In non-automated systems, when a customer calls the service center with a request, the service center manually routes the call to an agent that services the customer's request.

Interactive Voice Response (IVR) systems are systems that provide information in the form of recorded messages over telephone lines in response to customer input in the form of spoken words or touch tone signaling. Examples of IVR systems are those implemented by banks, which allow customers to check their balances from any telephone, and systems for providing automated stock quotes.

IVR may be used to both to acquire information from, or enter data into, a database. For example, banks and credit card companies use IVR systems so that their customers can receive up-to-date account information instantly and easily without having to speak directly to a person. An IVR system may also be used to gather information. For example, an IVR telephone survey might prompt the customer to answer questions by pushing the numbers on a touch-tone telephone.

When fully implemented, an IVR system does not require human interaction over the telephone. The customer's interaction with the database is predetermined by the extent to which the IVR system will allow the customer access to the data.

IVR systems have been successful because they generate significant cost savings due to the ability to route calls to the appropriate call center without having to incur the cost of a service representative to accomplish the routing. Once the call is routed, subsequent dialog with the customer could be additional IVR dialog or it could be assisted by a service representative. Thus, a given customer service task could be partly implemented with IVR and partly with human assistance.

The absence of a service representative can sometimes be frustrating to the customer, such as when an IVR system simply provides recorded answers that assume the customer has already correctly diagnosed a problem. On the other hand, although non-automated systems do provide a live service representative, customers can become frustrated if they are required to be put on hold to wait for service.

DETAILED DESCRIPTION OF THE INVENTION

The following description is directed to a method of overcoming the limitations of existing IVR systems. For purposes of the following description, "automated" dialogs are those that are implemented using IVR technology, typically in the form of recorded menu type selections but may be in the form of any type of prompt for interactive customer responses. The customer responses may be by touch tone, by voice recognition, TTY, some other type of telephone key pad, or some combination of these.

The method provides a customer service call system with two alternative dialogs; one partially automated and partially manual and the other fully automated. A customer who places a call to a call center begins at the partially automated dialog. When appropriate, the customer's call is routed from the partially automated dialog to the fully automated dialog. In this manner, the system balances the advantages and disadvantages IVR-implemented customer service call-centers.

Specifically, the method described herein provides customers with an IVR-type problem detection dialog with the opportunity to speak with a service representative for help in diagnosing and resolving the problem. However, the method also addresses the objections of customers to remaining in queues for long hold times by determining when they may be better served by an automated system.

For purposes of this description, customer service tasks are presented to call centers, with the customer initiating the call by telephone. Each task is deemed a "problem" to be solved, with the problem solving having three phases: detection, diagnosis, and resolution.

Figure 1:
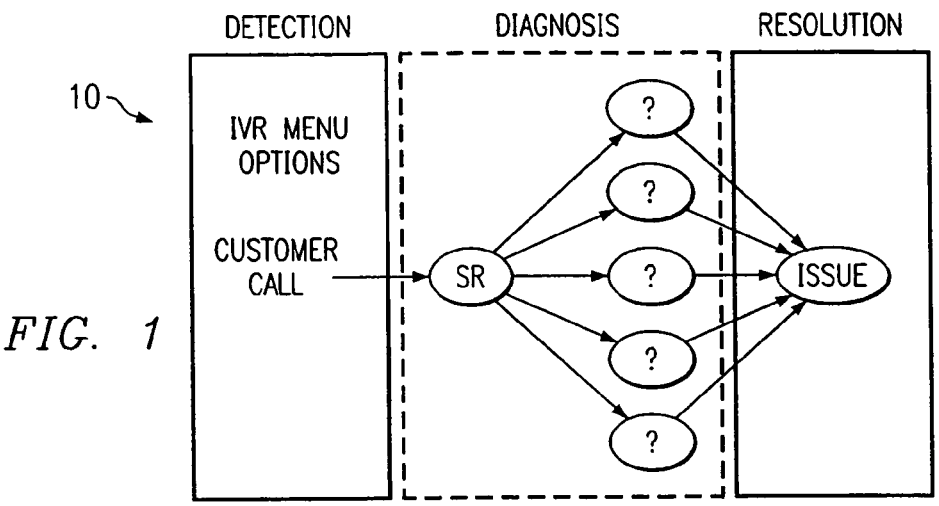
FIG. 1 illustrates a partially automated customer service dialog.

FIG. 1 illustrates a problem solving system 10, which is partially IVR-implemented. Specifically, problem detection is presented as an IVR-implemented dialog. That is, the customer identifies the problem to be solved from a menu of items. However, the diagnosis and problem resolution dialogs of system 10 are "manual", in the sense that once the specific problem is detected, a service representative (SR) is brought on-line to assist the customer with diagnosis and resolution of the problem.

In other words, system 10 requires the customer to detect a problem, then report the problem to a service representative who is trained in diagnosing the problem. The problem detection is IVR implemented in the sense that the customer responds to a menu type list of choices, by using either touch tone or voice responses. During the subsequent dialog, which is manual, the service representative asks the customer appropriate questions to aid in the diagnosis and to determine the solution.

Figure 2:
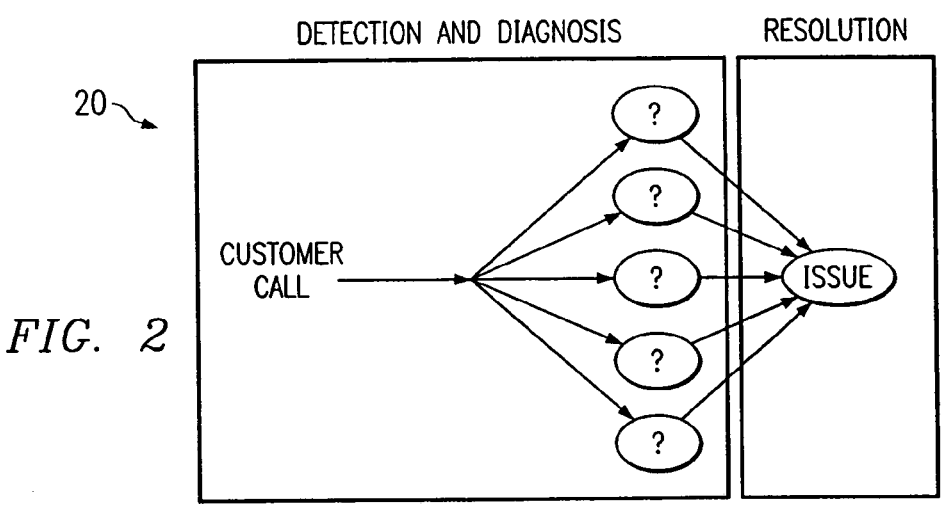
FIG. 2 illustrates a fully automated customer service dialog.

FIG. 2 illustrates a problem solving system 20 that is fully IVR implemented. The entire dialog of system 20 aids the customer in problem detection and diagnosis without any assistance from a service representative. System 20 incorporates a set of diagnostic questions, which assist the customer in mapping a detected problem to a solution. Thus, system 20 requires the customer to detect and diagnose the problem by answering queries. The queries can be in a "tree" type format, with the response to any particular question determining which query is to follow.

The diagnostic questions of system 20 are developed using the following principles. First, the questions are designed to permit the customer to successfully complete the task. Second, each question has an appropriate level of readability and comprehension. Third, the questions must be two sentences or less, and contain three instructions or less. Fourth, the questions must provide pause, repeat, backup, opt out, and get summary functionality.

Figure 3:
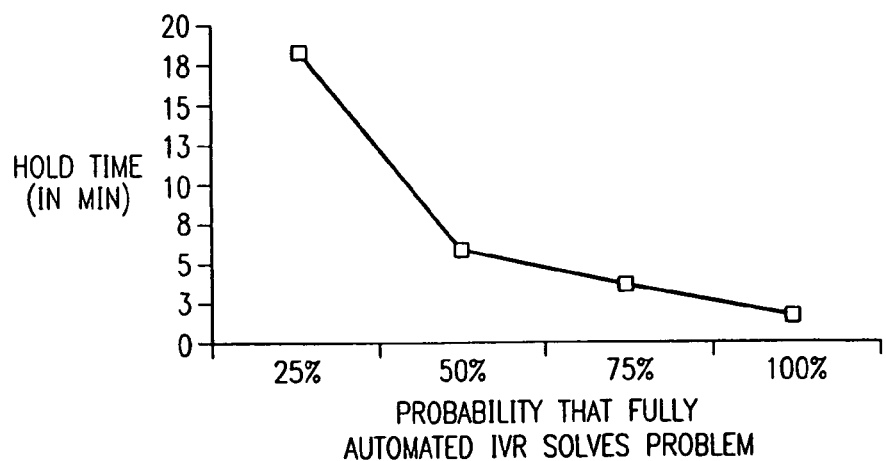
FIG. 3 illustrates the aggregated responses of customers when queried how long they would wait for service representative, given an alternative to attempt an automated problem solving system.

FIG. 3 illustrates a hold time function, derived from customer responses to a survey type query. As indicated above, one problem with manual systems, such as the manual dialog of system 10, is that customers may experience long hold times. FIG. 3 illustrates the hold time that a customer will willingly endure before speaking to a customer service representative, given the alternative of using an automated system, such as system 20. As illustrated, the more likely the automated system is to provide a solution, the less time the customer is willing to wait for a customer service representative. As explained below, FIG. 3 represents a "wait or switch" function, which may be used to determine when actual calls should be routed from a manual dialog to an automated dialog.

As an example of how the data of FIG. 3 might be obtained, a customer survey could be conducted. A sample group of customers might be presented with the following scenario: "You've called your Internet Service Provider to get help because you can't connect to the Internet. You've been put on hold and an announcement says you can either opt out to an automated problem solving system or you can wait to speak with a customer service representative. There is an [n] % chance that the APS could solve your problem. How long would you be willing to wait for a service representative before using the automated system?"

Figure 4:
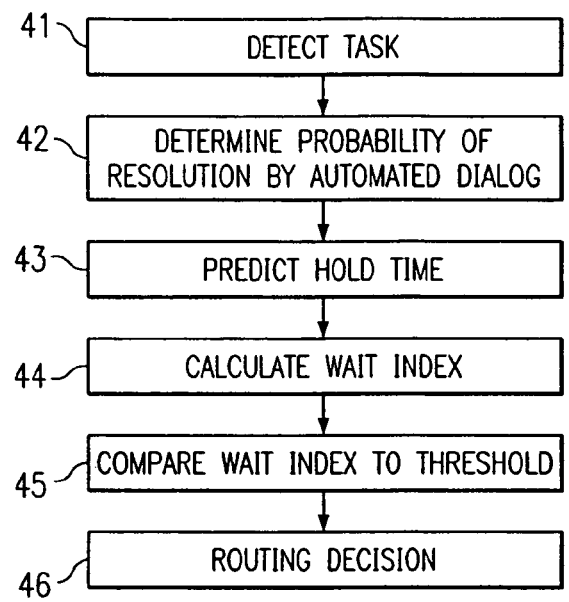
FIG. 4 illustrates a method of routing calls from a partially to a fully automated problem solving system in accordance with the invention.

FIG. 4 illustrates how the customer survey data of FIG. 3 may be used to develop a call-routing method, which permits a customer's call to be routed from a manual dialog, such as that of system 10, to an automated dialog, such as that of system 20. As explained below, the routing decision is based on two factors: an expected hold time for the manual dialog, and the probability that the automated dialog will resolve the customer's problem.

For a given call, the expected hold time and the probability of success are quantified and integrated into an algorithm, which provides an index value for the call. The index value is compared to a threshold value. Depending on the result of the comparison, the call is then left with the manual system 10 or routed to an automated system 20. Alternatively, instead of the customer's call being automatically routed, the customer could be asked to choose whether he or she desires to wait for a service representative or to use the automated system.

Referring to the specific steps of FIG. 4, Step 41 is determining the task to be performed for the customer. In the system 10 of FIG. 1, task identification is accomplished when the customer selects a menu option at the outset of the IVR problem detection dialog. In other embodiments, Step 41 could be performed using a live service representative who interacts with the customer to determine the nature of the problem.

Step 42 determines the probability that the detected task can be successfully resolved by the automated system 20. For this step, it is assumed that some basis exists for determining this probability, such as statistical data representing past calls and success rates. The task identification information is the subject of a database lookup to determine the probability that the customer will receive a satisfactory resolution from the automated system. Step 43 is determining the expected hold time for the customer. This may be accomplished by querying the call center queue size.

Step 44 is using the probability of success value (determined in Step 42) and the expected hold time value (determined in Step 43) to calculate a customer wait index. The following equation is an example of how these two values may be used in this manner:

$$\text{Wait Index} = HT + 74.6\ PS - 44\ PS^2 - 33.25,$$

where HT is the expected hold time in minutes and PS is the probability of solution.

The above function is derived from customer preference data, such the data illustrated in FIG. 3. For example, the curve of FIG. 3 can be fitted to an equation that best matches the curve, resulting in a function such as that set out above.

Step 45 is comparing the Wait Index to a threshold value. A threshold of 0 indicates that the current hold time (HT) and the current probability of solution (PS) values both match predetermined customer expectancies.

Step 46 is routing the call based on the result of the comparison. Positive values of the Wait Index indicate that a combination of HT and PS are greater than the threshold. In this case, the call is automatically routed to the automated system. Negative values of the Wait Index indicate that the combination of HT and PS are less than the threshold. In this case, the customer remains in the manual dialog queue to speak to a service representative. In either case, the customer may alternatively be queried to determine if he or she would like to be routed to the automated system.

The following example illustrates how the above-described method works for a call with HT=10 and PS=0.50.

$$\text{Wait Index} = 10 + 74.6\,(.5) - 44\,(.5)^2 - 33.25$$
$$= 10 + 37.3 - 11 - 33.25$$
$$= 3.05$$

This positive value results in the call being routed to the automated system, or the customer being queried about remaining in the queue.

The following example illustrates how the method works for a call with HT=1 and PS=0.50.

$$\text{Wait Index} = 1 + 74.6\,(.5) - 44\,(.5)^2 - 33.25$$
$$= 1 + 37.3 - 11 - 33.25$$
$$= -5.95$$

This negative value results in the call remaining in the queue or the customer being queried about opting for the automated system.

In accordance with the above-described method, when hold times do not meet customer expectancies, customers may be automatically routed to an automated problem system 20, which can assist in problem diagnosis. The use of the wait index, with thresholds based on customer data may also be used to give the customer control over the decision to opt for the automated system.

Figure 5:
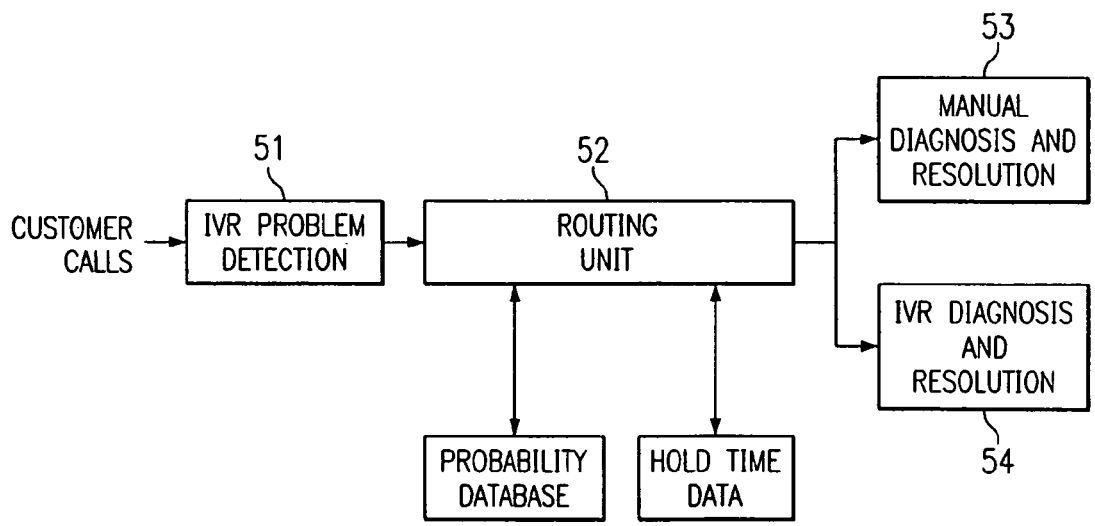
FIG. 5 illustrates a customer service call system having a routing unit in accordance with the invention.

FIG. 5 represents a customer call center system in accordance with the invention. The customer initially interacts with an IVR problem detection dialog 51, such as the detection dialog of FIG. 1. In other embodiments, dialog 51 could be a manual dialog, in which the customer interacts with a service representative. Once the task to be solved is determined, a routing unit 52 is programmed to calculate a wait index, compare the index to a threshold, and obtain a routing decision, as described above in connection with FIG. 4. Depending on the routing decision, the call is routed to the manual system 53 where the customer interacts with a live service representative or to the automated system 54 where the customer interacts with an IVR dialog. It is assumed that each of the elements of FIG. 5 is implemented with appropriate hardware and software. The routing unit is implemented with computer programming and databases appropriate for performing the above described functions. Suitable implementations of the various dialogs are known in the art or capable of being developed.

OTHER EMBODIMENTS

Although the present invention has been described in detail, it should be understood that various changes, substitutions, and alterations can be made hereto without departing from the spirit and scope of the invention as defined by the appended claims.

What is claimed is:

1. A method of routing a customer's call to either a manual dialog or an automated dialog of a customer service call system, comprising:
    detecting a task to be resolved by the call;
    determining a probability value representing the probability that the task will be successfully resolved by the automated dialog;
    predicting a hold time to reach the manual dialog;
    calculating a wait index as a function of the hold time and the probability value; and
    determining whether to route the call to the manual dialog or the automated dialog based at least on the calculated wait index.

2. The method of claim 1, wherein detecting a task to be resolved by the call is based on a selection from an interactive voice response menu.

3. The method of claim 1, wherein the probability value is determined at least by accessing data that is representative of calls made using the automated dialog.

4. The method of claim 1, wherein predicting the hold time includes accessing data representing a current queue of the call system.

5. The method of claim 1, wherein the wait index is calculated as a function of the results of a customer survey.

6. The method of claim 1, further comprising automatically routing the call to the manual dialog or the automated dialog.

7. The method of claim 1, wherein determining whether to route the call to the manual dialog or the automated dialog includes querying a caller to make a routing decision.

8. A routing system for a customer service system having alternative manual and automated dialogs, the routing system comprising:
    a task detection system that elicits a task to be performed for a caller; and
    a routing unit that includes logic that: determines a probability value representing the probability that the task will be successfully performed by the automated dialog; predicts a hold time to reach the manual dialog; calculates a wait index as a function of the hold time and the probability value; and determines whether to route the call to the manual dialog or the automated dialog based at least on the calculated wait index.

9. The system of claim 8, wherein the task detection system comprises an interactive voice response system.

10. The system of claim 8, wherein the task detection system uses a manual process.

11. The system of claim 8, further comprising a database including data from past calls using the automated dialog, the database being accessible by the routing unit.

12. The system of claim 8, wherein the routing unit predicts the hold time based at least on accessed data representing a current queue of the call system.

13. The system of claim 8, wherein the routing unit automatically routes the call.

14. The system of claim 8, wherein the routing unit queries the caller to make a routing decision.

15. A method of routing a call to either a manual dialog or an automated dialog of a call system, the method comprising:
    determining a task to be resolved for a caller;
    determining a probability that the task can be successfully resolved by the automated dialog;
    predicting a hold time to reach the manual dialog; and
    determining whether to route the call to the manual dialog or the automated dialog based at least on the determined hold time and the determined probability.

16. A method of claim 15, wherein determining the task to be resolved for the caller includes receiving a selection from the caller via an interactive voice response menu.

17. A method of claim 15, wherein determining the probability value includes accessing data that is representative of calls using the automated dialog.

18. A method of claim 15, wherein predicting the hold time includes accessing data regarding a current queue of the call system.

19. A method of claim 15, wherein the determination of whether to route the call to the manual dialog or the automated dialog is further based on results of one or more caller surveys.

20. A call routing system having manual and automated dialogs, the system comprising:
    a task detection system operable to determine a task to be performed for a caller; and
    a routing unit operable to:
        determine a probability that the task can be successfully resolved by the automated dialog;
        predict a hold time to reach the manual dialog; and
        determine whether to route the call to the manual dialog or the automated dialog based at least on the determined hold time and the determined probability.

21. A system of claim 20, wherein the task detection system includes an interactive voice response system.

22. A system of claim 20, wherein the task detection system facilitates a manual process for determining the task to be performed for the caller.

23. A system of claim 20, further comprising an automated dialog system operable to:
- present one or more queries to the caller
- receive responses to the queries; and
- automatically generate one or more new queries based on the received responses.

24. A system of claim 23, further comprising a database including data from past calls made using the automated dialog system, wherein the database is accessible by the routing unit.

25. A system of claim 20, wherein the routing unit is operable to predict the hold time based at least on accessed data representing one or more current queues of the call routing system.

26. A system of claim 8, the routing system further comprising an automated dialog system that presents queries to the caller, receives responses to the queries, and generates new queries based on the responses.

* * * * *

UNITED STATES PATENT AND TRADEMARK OFFICE
CERTIFICATE OF CORRECTION

PATENT NO.       : 7,120,244 B2  
APPLICATION NO.  : 10/948507  
DATED            : October 10, 2006  
INVENTOR(S)      : Kurt M. Joseph, Aaron W. Bangor and Robert R. Bushey Page 1 of 1

It is certified that error appears in the above-identified patent and that said Letters Patent is hereby corrected as shown below:

On the title page (56) after "6,731,722" delete "B!" and insert therefor --B2--.

On the title page (56), after 6,807,274" delete "B1" and insert therefor --B2--.

On column 7 line 3, after "caller" insert --;--.

Signed and Sealed this

Nineteenth Day of February, 2008

JON W. DUDAS  
*Director of the United States Patent and Trademark Office*